(12) United States Patent
Zhao

(10) Patent No.: US 11,050,079 B2
(45) Date of Patent: Jun. 29, 2021

(54) ELECTRO-FUEL ENERGY STORAGE SYSTEM AND METHOD

(71) Applicant: THE HONG KONG UNIVERSITY OF SCIENCE AND TECHNOLOGY, Hong Kong (CN)

(72) Inventor: Tianshou Zhao, Hong Kong (CN)

(73) Assignee: THE HONG KONG UNIVERSITY OF SCIENCE AND TECHNOLOGY, Hong Kong (CN)

(*) Notice: Subject to any disclaimer, the term of this patent is extended or adjusted under 35 U.S.C. 154(b) by 113 days.

(21) Appl. No.: 16/482,158

(22) PCT Filed: Mar. 13, 2018

(86) PCT No.: PCT/CN2018/078827
§ 371 (c)(1),
(2) Date: Jul. 30, 2019

(87) PCT Pub. No.: WO2018/166443
PCT Pub. Date: Sep. 20, 2018

(65) Prior Publication Data
US 2021/0104768 A1    Apr. 8, 2021

(30) Foreign Application Priority Data
Mar. 14, 2017   (CN) .......................... 201710150419.9

(51) Int. Cl.
*H01M 8/18* (2006.01)
*H01M 8/04082* (2016.01)

(52) U.S. Cl.
CPC ....... *H01M 8/188* (2013.01); *H01M 8/04216* (2013.01)

(58) Field of Classification Search
CPC .................. H01M 8/04216; H01M 8/188
USPC ........................................... 429/105
See application file for complete search history.

(56) References Cited

U.S. PATENT DOCUMENTS

2013/0011702 A1*  1/2013  Horne .................... B60L 50/64
                                                        429/51

FOREIGN PATENT DOCUMENTS

| CN | 103000924 A  | 3/2013 |
| CN | 104362357 A  | 2/2015 |
| CN | 107039670 A  | 8/2017 |
| JP | 2006-217698 A | 8/2006 |

OTHER PUBLICATIONS

International Search Report in International Application No. PCT/CN2018/078827, filed Mar. 13, 2018.

* cited by examiner

*Primary Examiner* — James M Erwin
(74) *Attorney, Agent, or Firm* — Saliwanchik, Lloyd & Eisenschenk

(57) ABSTRACT

An e-fuel energy storage system and method are provided. The e-fuel energy storage system comprises e-fuel, an e-fuel charger, and an e-fuel cell, wherein the component such as an electrode and membranes, material, and design configured to charge the e-fuel are independent and different from the component such as an electrode and membranes, material, and design configured to discharge the e-fuel.

17 Claims, 8 Drawing Sheets

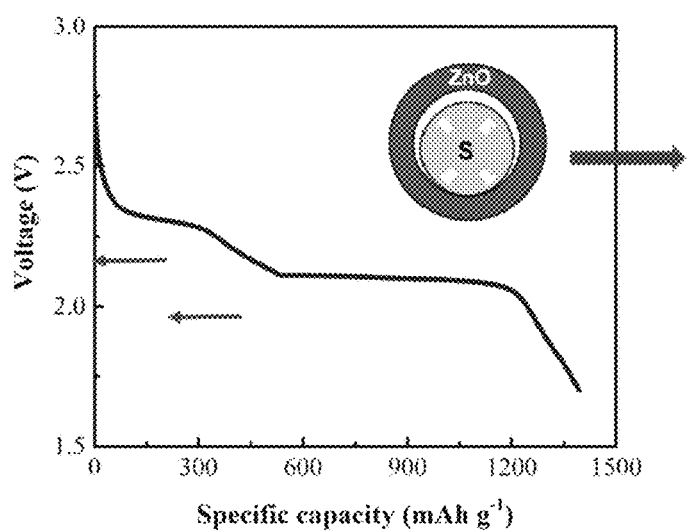 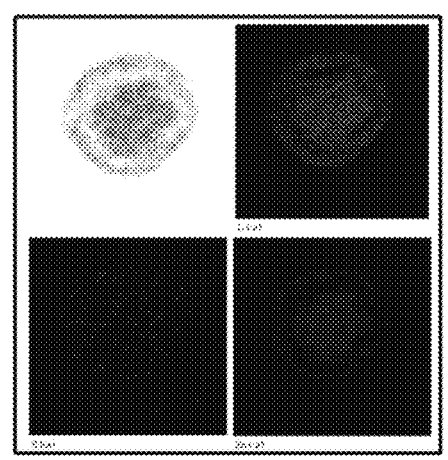
Figure 9                               Figure 10

ELECTRO-FUEL ENERGY STORAGE SYSTEM AND METHOD

CROSS-REFERENCE TO RELATED APPLICATIONS

This application is the U.S. national stage application of International Patent Application No. PCT/CN2018/078827, filed Mar. 13, 2018, which claims the benefit under 35 U.S.C. § 119 of Chinese Application No. 201710150419.9, filed Mar. 14, 2017, the disclosures of each of which are incorporated herein by reference in their entirety.

TECHNICAL FIELD

This invention relates to the field of energy storage technologies, and in particular, to an e-fuel energy storage system and method.

BACKGROUND OF THE INVENTION

Energy shortage and climate change are among the major problems in the world today. An effective way to solve these problems is by increasing the proportion of renewable energy to solve energy and environmental problems. Solar energy and wind energy are two of the largest sustainable sources of carbon-free power, and remarkable progress in both solar photovoltaics (PVs) and wind turbines has been achieved in the past decades. However, the electricity generated from these power sources are intermittent and fluctuant, and thus unreliable. An ultimate solution is to develop off-grid and micro-grid systems that can store energy to secure an efficient and stable supply of electricity, and the energy storage system is the crucial factor of this solution. We propose an energy storage system that incorporates liquid fuels containing regenerative electroactive species, known as e-fuels. E-fuels can store intermittent electricity when harvested with solar cells and wind turbines, and release the electricity wherever and whenever on demand. Although solid-state batteries have been widely used in the small-scale energy storage, there are still some difficulties in implementing applications in large-scale energy storage due to some technical, economic, and safety issues such as poor scalability, high cost, and a short lifetime. Moreover, it can not realize quick and dynamic power compensation and voltage regulations, and it can not be used to suppress dynamic oscillations and smooth the output of renewable energy generation. An emerging alternative to the solid-state batteries is flow battery, which represents a promising energy storage technology as it offers advantages including excellent scalability, high energy efficiency, long lifetime, and no geographical limitations. However, state-of-the-art flow batteries have yet to penetrate the market, mainly because of their high cost and limited energy density.

In summary, none of the existing or emerging technologies can fully meet future energy storage requirements. To enable the widespread deployment of intermittent and scattered renewables, it is essential to develop an energy storage technology that is scalable, efficient, inexpensive, durable, and site-independent.

BRIEF SUMMARY OF THE INVENTION

In a first aspect, this invention provides an e-fuel energy storage system which includes e-fuel, an e-fuel charger, and an e-fuel cell. The e-fuel is electroactive and rechargeable liquid fuel selected from the group consisting of inorganic e-fuel including $Fe^{2+}/Fe^{3+}$, $V^{2+}/V^{3+}$ or $Mn^{2+}/Mn^{3+}$; and organic e-fuel including alloxazine and nitroxyl free radical, quinone or methylbipyridine-ferrocene; nanofluid e-fuel including lithium sulfide, lithium titanate, lithium nickel manganese oxide, zinc oxide or high-molecular polymers.

The e-fuel charger, comprising an anode, a cathode, and a membrane independent from the e-fuel cell, is configured for charging the e-fuel. The anode, the cathode, and the membrane are configured to match and be compatible with the e-fuel.

The e-fuel cell, comprising a positive electrode, a negative electrode, and a membrane, is configured for discharging the e-fuel. The positive electrode, the negative electrode, and the membrane are configured to match and be compatible with the e-fuel.

In one embodiment, in the mentioned e-fuel energy storage system, the cell structure and component (e.g., electrodes, membranes) are configured to match the optimized performance of the e-fuel charger and the e-fuel cell. Taken the $V^{2+}/V^{3+}$ and air-based inorganic e-fuel system as an example, the e-fuel charger comprises graphite felt, polybenzimidazole (PBI) membrane, and $IrO_2$ catalyst, and the e-fuel cell comprises carbon paper, Nafion membrane and platinum on carbon (Pt/C) catalyst. In the methylbipyridine-ferrocene-based organic e-fuel system, the e-fuel charger comprises graphite felt, anion exchange membrane while the e-fuel cell comprises carbon paper and porous membrane. In the sulfur hosted in zinc oxide (ZnO) yolk-shell structure (S/YS—ZnO)-based nanofluid e-fuel system, the e-fuel charger comprises conductive carbon black, porous membrane, and carbon paper, and the e-fuel cell comprises carbon nanoparticles, porous membrane, and electrospun carbon matrix.

In one embodiment, the e-fuel energy storage system includes energy source providing electrical energy to the e-fuel charger, wherein the energy source can be solar energy or wind energy. In another embodiment, the e-fuel energy storage system includes receiver systems receiving electrical energy provided by the e-fuel cell. They can be either the grid system or the off-grid system.

In one embodiment, an operating temperature of the e-fuel energy storage system is equal to or lower than 70° C. In another embodiment, the e-fuel energy storage system of the invention has a maximum power density of 800 mW/cm².

According to a second aspect, this invention provides an e-fuel energy storage method, which includes the e-fuel energy storage system of the first aspect.

In one embodiment, the e-fuel energy storage method in this invention further includes a charging process of the e-fuel: the electrical energy is converted to the chemical energy of the e-fuel by an e-fuel charger, and a discharging process of e-fuel: The chemical energy is converted back to electrical energy by an e-fuel cell. Herein, the e-fuel is electroactive species that can be repeatedly charged and discharged and remains stable before and after the charging and discharging processes.

The above-mentioned system and methods are advantageous in that: 1. The e-fuel system, comparing to the conventional solid-state and flow batteries, allows simultaneous storage and utilization of electrical energy, since the e-fuel charger and the e-fuel cell operate independently. The flexible regulation of capacity and power can provide an off-grid power supply for powering places not on the grid and can also be readily integrated with the grid. The e-fuel system of this invention can simultaneously store and release electric energy at different places. The charged e-fuels can be readily stored and transported like gasoline.

Moreover, the e-fuel cell has a strong potential for propelling next-generation vehicles over greater distances with a gasoline-like refueling time to be completed in a few minutes. The capital cost of the system of this invention can be half or even less than half of the conventional lithium-ion batteries. 2. The e-fuel energy storage system of this invention has high flexibility in selecting and preparing electro-active materials. Redox species in the conventional flow batteries cannot simultaneously meet the property of reversibility and other requirements such as power density, energy efficiency, cell potential, cost, and stability. In this invention, the e-fuel charger and e-fuel cell are independent. This feature allows both the e-fuel charger and e-fuel cell to be designed and optimized in accordance not only with their component (e.g. electrode, membrane), material and design but also with individual performance targets, eliminating the conflicts between charge and discharge processes, and there is a high flexibility in selecting and creating electro-active materials as e-fuels. The e-fuel charger can store intermittent energy generated from solar cells or wind turbines, then release electricity through the e-fuel cell whenever and wherever needed to meet the requirements of the grid system and off-grid systems. The energy density of the e-fuel storage system of this invention can be as high as 150-300 Wh/L. Its energy efficiency can be higher than 80% (the energy efficiency of the state-of-the-art hydrogen storage system is about 50%). The capital cost of the system can meet the target set by the United States Department of Energy (DOE) (250 $/kWh).

Unlike conventional batteries which constrain the two reactions to the same electrode surface, the e-fuel system of this invention separates the reduction and oxidation reactions onto two electrodes that can be designed and optimized to maximize the kinetics of the two reactions, respectively. For instance, the lead catalyst cannot be used in the electrode of iron-chromium redox flow batteries because it is unstable during the discharge process. The sluggish kinetics of chromium reduction limits the development of this low-cost flow battery technology. In the e-fuel system, this issue no longer exists. The lead catalyst can be only used in the reduction electrode while bismuth can be used in the oxidation electrode. Thus, the kinetics of both reactions can boost and the energy efficiency can be elevated.

The e-fuel energy storage system of the invention can design the electrodes in the e-fuel charger and the e-fuel cell to effectively suppress side reactions. In the conventional battery system, many electrode materials that effectively suppress side reactions cannot be used in a bi-functional mode, as they are unstable when the current is reversed. In the e-fuel energy storage system of this invention, the side reactions can be effectively suppressed by separated electrode design and preparation, because the e-fuel charger and the e-fuel cell works independently.

The e-fuel energy storage system of this invention facilitates heat and mass management. It is well known that the safety issues of storage and transportation of hydrogen in fuel cells and heat generation in lithium-ion batteries have been major factors restricting their development. In the e-fuel energy storage system, the liquid e-fuel, as an energy carrier, has excellent heat transfer performance. The e-fuel, stored in the external tank, can be produced and used immediately or stored stably for a long time. It provides a safe and reliable choice for stationary and mobile systems. Moreover, the e-fuel cell has great potential to be applied as the power device for electric vehicles. The electric vehicles powered by e-fuel cells will have a longer driving range, and its "charging process" is comparable to that of gasoline refueling which is convenient and fast. The e-fuel cell can realize continuous power supply for electric vehicles effectively and stably.

BRIEF DESCRIPTION OF THE DRAWINGS

FIG. 9 shows voltage profiles of a nanofluid e-fuel cell according to an embodiment of the subject invention.

FIG. 10 shows a transmission electron microscopy (TEM) image of a S/YS—ZnO structure according to an embodiment of the subject invention.

DETAILED DISCLOSURE OF THE INVENTION

In order to facilitate the understanding of this invention, the present invention will be described more comprehensively. However, the invention can be embodied in many different forms and is not limited to the examples described herein. Rather, these examples provided the aim to make a more thorough and comprehensive understanding of this invention.

Unless defined, all technical and scientific terms used herein have the same meaning as commonly understood by one of ordinary skills in the art to which this invention belongs. The terminology used in the description of the present invention is to describe particular examples and is not intended to limit the invention. The term "and/or" as used herein includes any and all combinations of one or more of the associated listed items.

The e-fuel energy storage system and methods of this invention comprise an electroactive liquid fuel (e-fuel) which can be charged and discharged repeatedly. The electric energy generated by the solar photovoltaic or wind power device is supplied to the e-fuel charger to complete the charging process of the e-fuel converting the electric energy into the chemical energy. The charged e-fuel is then filled into the e-fuel cell to release electric energy to power the electric unit. In the e-fuel energy storage system, solar and wind energies are converted to chemical energy of e-fuel, which effectively addresses the issues of intermittent, unstable and noncontinuous of the renewable energy, thereby realizing long-term storage and stable supply. The e-fuel, stored in an external tank, can be produced and used immediately or stored stably for a long time. The e-fuel charger and the e-fuel cell are independent. The system has no site limitations. The e-fuel can be charged and discharged whenever and wherever needed. The power supply of the e-fuel cell is stable and flexible, and the generated power can be integrated into the grid systems or to the off-grid systems. Moreover, the e-fuel cell has great potential to be applied as a power device for electric vehicles. The invention can realize the large-scale application of renewable energy.

Figure 1:
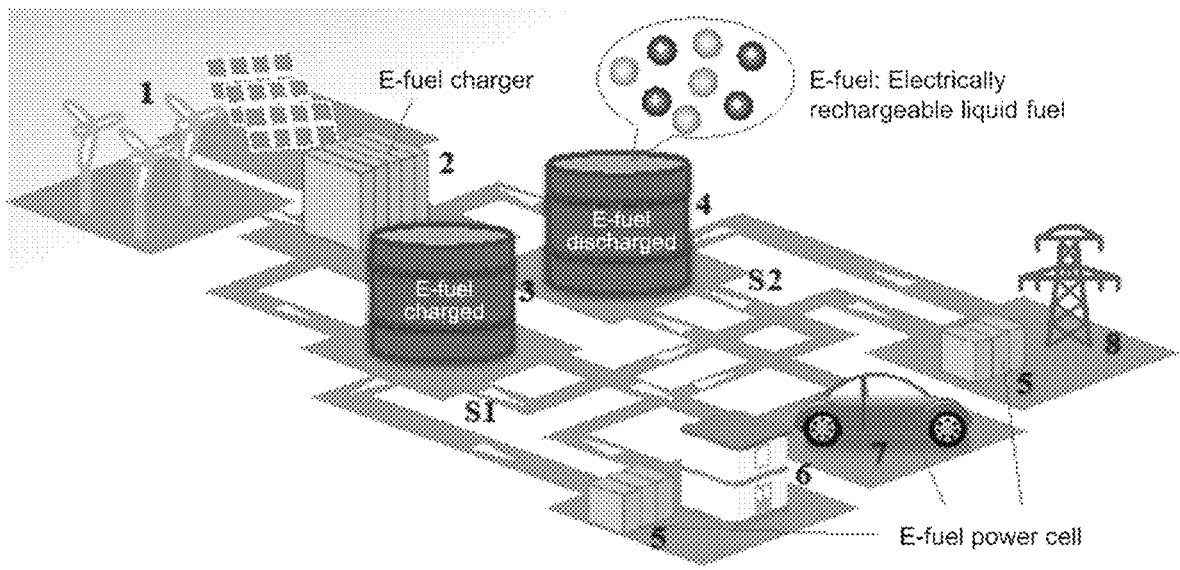
FIG. 1 is a schematic diagram of an e-fuel energy storage system according to an embodiment of the subject invention.

The e-fuel energy storage system (shown in FIG. 1) of this invention works as described in following processes: the discharged e-fuel (S2) is firstly stored in the first e-fuel storage tank (4). The charging process occurs in the e-fuel charger (2) with electrical energy provided by the solar and wind powers (1). The charged e-fuel (51) is stored in the second e-fuel storage tank (3), and filled into the e-fuel cell (5) to release electricity for the conversion of chemical energy to electric energy. The electric energy generated by the e-fuel cell (5) can supply off-grid systems (6), remote mountainous areas, communication base stations and other off-grid systems (6), and can also directly connect to the grid systems through an inverter (8). Meanwhile, the e-fuel cell (5) can be applied as a power device for an electric vehicle (7). After the electrical energy is released, the discharged e-fuel (S2) is returned to the first e-fuel storage tank (4) to complete the cycle.

In one embodiment, the e-fuel energy storage system herein is an inorganic e-fuel system, wherein the e-fuel includes $V^{2+}/V^{3+}$ and air. The e-fuel charger (2) comprises graphite felt, a membrane such as a PBI membrane, and $IrO_2$ catalyst for oxygen evolution reaction (OER), while the e-fuel cell (5) comprises carbon paper, membrane such as Nafion 212, and Pt/C catalyst for oxygen reduction reaction (ORR).

In a further embodiment, the e-fuel energy storage system of this invention is a vanadium-air energy storage system, which uses inorganic vanadium e-fuel as energy carrier. The system includes e-fuel charger (2) and e-fuel cell (5). Specifically, it includes the preparation of vanadium e-fuel, the assembly of vanadium e-fuel cells, and the performance evaluation of vanadium-air e-fuel energy storage systems.

Preparation procedures of inorganic vanadium e-fuel comprises preparing acid electrolyte containing $V^{2+}$, $SO_4^{2-}$, $Cl^-$ and $H^+$. The concentration of $V^{3+}$ will gradually increase with the consumption of $V^{2+}$. The total concentration of vanadium can reach 5 M. Renewable energies such as solar and wind can be used as energy sources to produce vanadium e-fuel.

Figure 2:
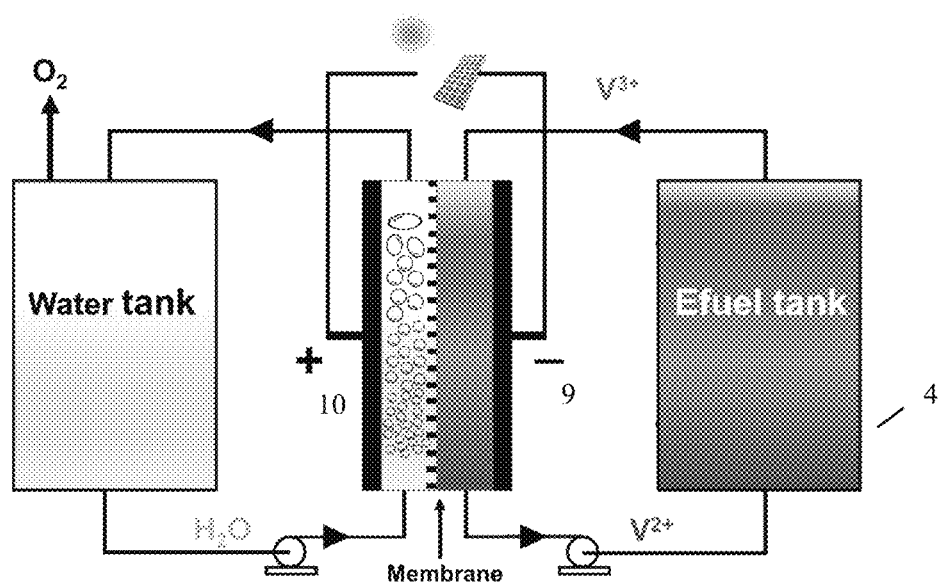
FIG. 2 is a schematic diagram depicting an e-fuel charger preparing inorganic vanadium e-fuel based on a preparation method 1 according to an embodiment of the subject invention.
Figure 3:
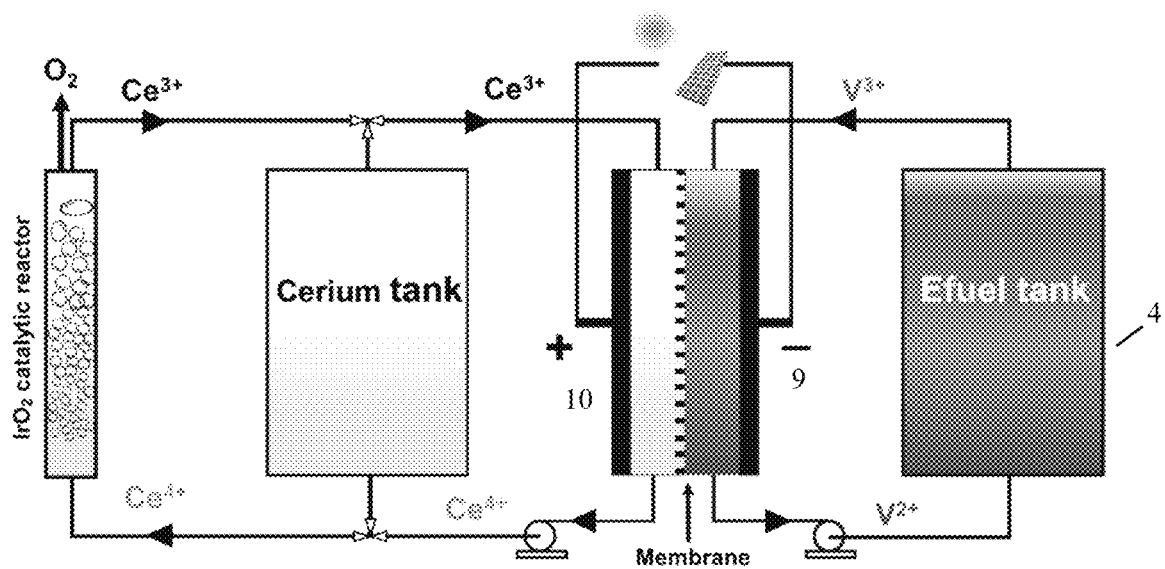
FIG. 3 is a schematic diagram depicting an e-fuel charger preparing inorganic vanadium e-fuel based on a preparation method 2 according to an embodiment of the subject invention.

The preparation method 1 of vanadium e-fuel:

As shown in FIG. 2, in the cathode (9) where $V^{3+}$ to $V^{2+}$ reduction reaction occurs, the electrode comprises inexpensive porous graphite. In the anode (10) where water is oxidized to generate oxygen and protons, the electrode comprises hydrophilic porous titanium decorating OER catalysts. The reaction process can be described as follows:

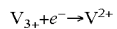  Cathode:

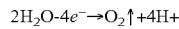  Anode:

The preparation method 2 of vanadium e-fuel:

Since the oxygen evolution reaction in the electrochemical routine has a high overpotential, the electrodes and the bipolar plates are easily corroded, leading to a fast deterioration of the battery performance. An optimized method 2 with a multi-circuit preparation scheme for preparing inorganic vanadium e-fuel is shown in FIG. 3. Unlike the conventional method to directly electrolyze water, a highly reversible $Ce^{4+}/Ce^{3+}$ redox couple is used as the electron carrier in the anode (10) (the main composition: $Ce^{4+}$, $SO_4^{2-}$, $H^+$ and a small amount of $CH_3SO_3H$). During the charging process, $Ce^{3+}$ is firstly electrochemically oxidized to $Ce^{4+}$. The oxidized $Ce^{4+}$ then flows through another circuit and enters the catalytic bed carrying $IrO_2$. Under the catalysis effect of $IrO_2$, $Ce^{4+}$ and $H_2O$ directly undergo a rapid chemical reaction to form $O_2$, $H^+$, and $Ce^{3+}$. The reaction process can be described as follows:

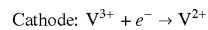

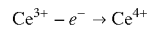

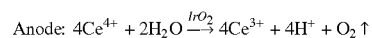

Figure 4:
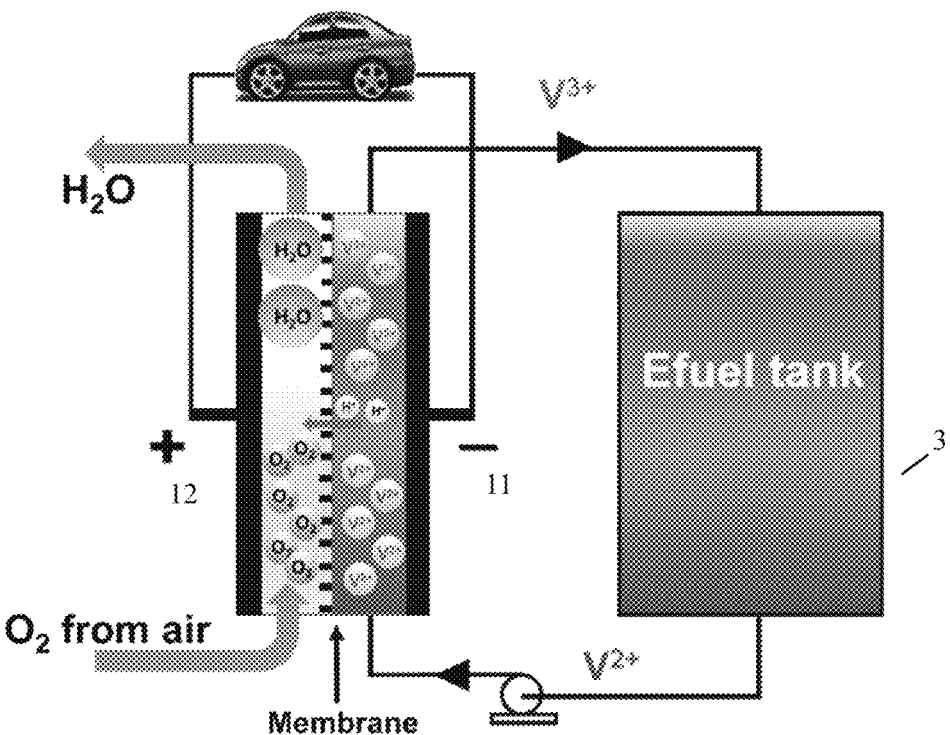
FIG. 4 shows a schematic diagram of an e-fuel cell according to an embodiment of the subject invention.

The vanadium e-fuel cell is assembled as follows:

As shown in FIG. 4, the inorganic vanadium e-fuel cell (5) comprises an acid electrolyte containing divalent vanadium ions ($V^{2+}$) as negative active species and oxygen from the air as positive active species.

On the negative side (11), a carbon cloth with a thickness ranging from 100 to 400 μm or carbon paper is selected as an electrode to reduce the cell internal resistance. The carbon fibers of the electrode have secondary pores of about 5 nm, increasing electrochemical surface area to provide sufficient active sites for the $V^{2+}$ to $V^{3+}$ reaction. The flow field plate with serpentine or interdigitated flow channels is used as a current collector to reduce contact resistance and enhance the mass transport of active species. On the positive side (12), hydrophobic carbon paper is used as a gas diffusion layer, and a high specific surface area porous catalyst layer is disposed between the gas diffusion layer and the membrane. The reaction process is as follows:

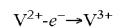  Negative side:

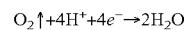  Positive side:

The maximum power density of vanadium air e-fuel cell (5) reaches 800 mW/cm², which is times higher than the value of vanadium air battery reported in previous literature. Meanwhile, due to the independently optimized structure design of the charge and discharge units, the energy efficiency of the system (defined as the ratio of energy between the discharge and charge processes) can be as high as 80%.

The technical advantages of the inorganic e-fuel system in this embodiment:

(1) High energy density: The solubility of $V^{2+}/V^{3+}$ in the acid electrolyte can reach 5 M, and an energy density of 196 Wh/L can be achieved, which is about 6 times higher than that of the all-vanadium flow battery (32 Wh/L). The high energy density enables the system to have a potential to drive vehicles.

(2) Low capital cost: In the vanadium-air e-fuel cell (5), half of the active material comes from oxygen in the air, and the cost of electroactive species is only half of that of the all-vanadium redox flow battery. The cost of other components, such as pipes, pumps, and liquid storage tanks, can also be significantly reduced compared to vanadium flow batteries. Moreover, since highly oxidized $VO_2^+$ can be avoided in the cathode, the low-cost hydrocarbon porous membranes can be used in the system, thus further reducing the capital cost of the system.

(3) Wider operating temperature: In the conventional vanadium flow battery, when the temperature is higher than 40° C., the $VO_2^+$ in the electrolyte will be thermally precipitated. In the e-fuel system, the temperature increase benefits the solubility improvement and the $V^{3+}/V^{2+}$ redox reaction kinetics. The operating temperature of the system can be as high as 70° C.

(4) Independent design of the charging and discharging units: The decoupled charging and discharging processes benefit the optimization based on each reaction requirement, enabling the system to be operated efficiently, stably, and reliably.

Figure 5:
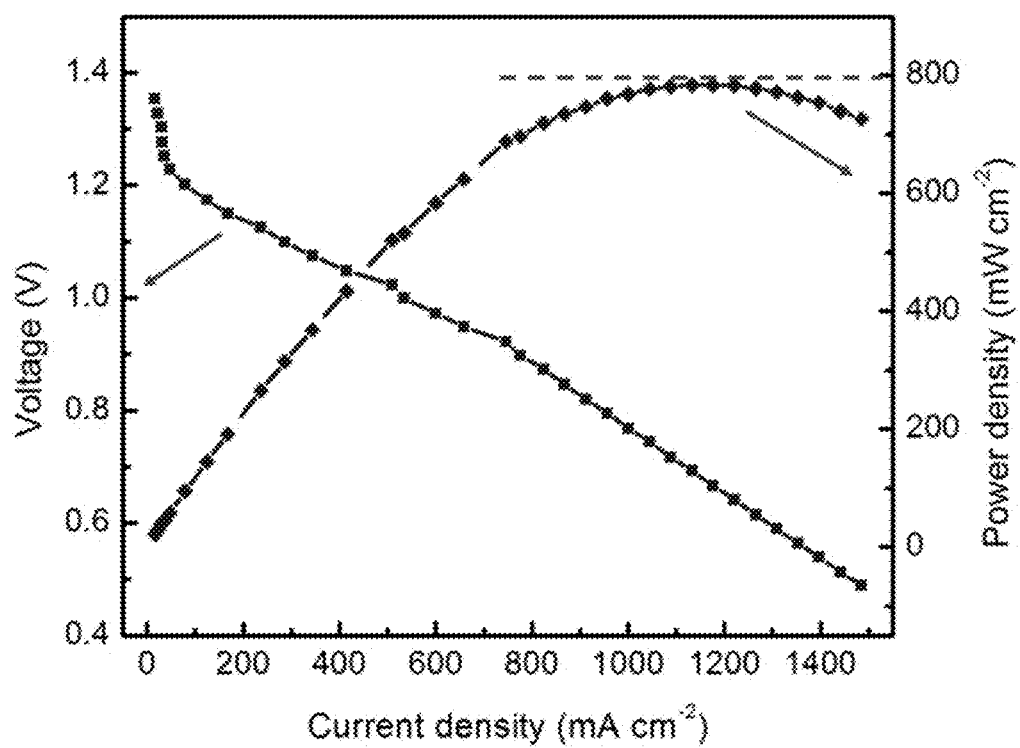
FIG. 5 shows a polarization curve of an inorganic e-fuel cell according to an embodiment of the subject invention.

FIG. 5 shows a polarization curve of the inorganic e-fuel cell according to an embodiment of the subject invention.

Figure 6:
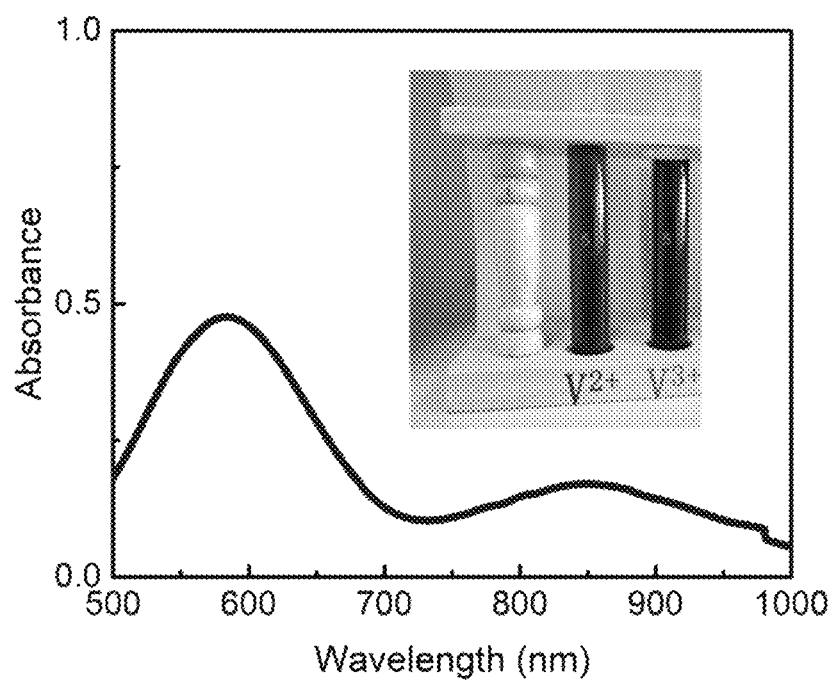
FIG. 6 shows UV-vis spectra of an inorganic e-fuel according to an embodiment of the subject invention.

FIG. 6 shows UV-vis spectra of the inorganic e-fuel according to an embodiment of the subject invention.

Figure 7:
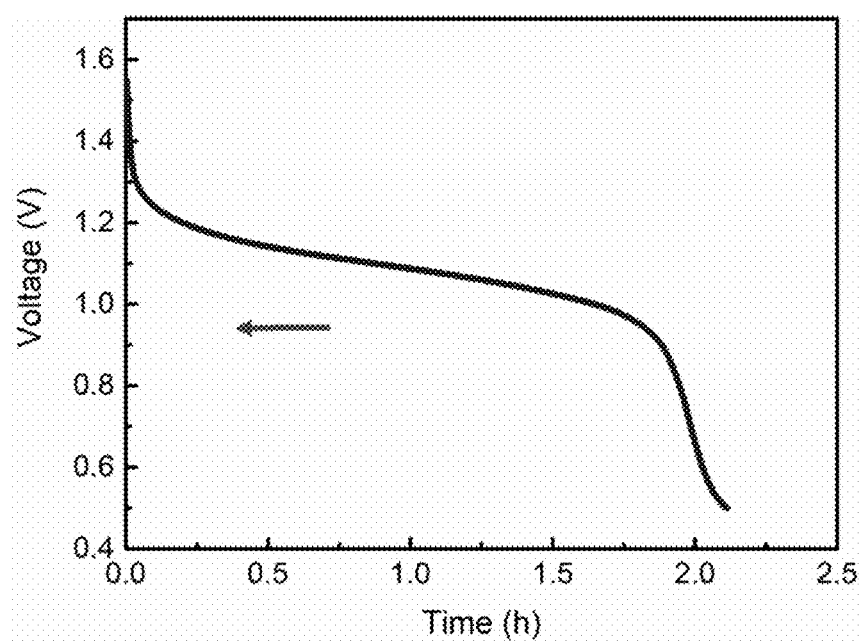
FIG. 7 shows a voltage profile of an organic e-fuel cell according to an embodiment of the subject invention.
Figure 8:
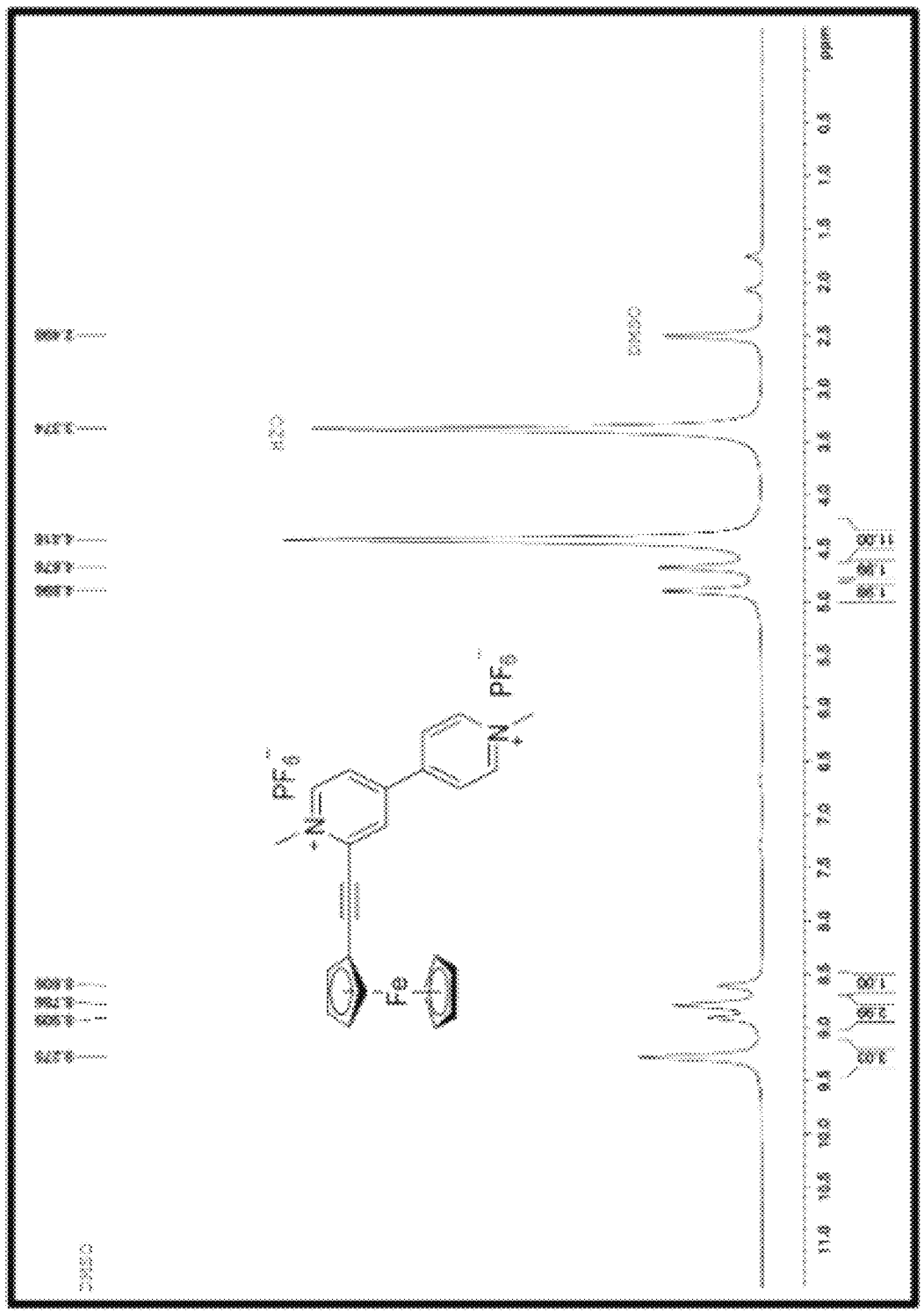
FIG. 8 shows NMR spectra of an organic e-fuel according to an embodiment of the subject invention.

FIG. 7 shows a voltage profile of the organic e-fuel cell according to an embodiment of the subject invention. In another embodiment, the e-fuel energy storage system of the present invention is an organic e-fuel system, wherein the e-fuel comprises methylbipyridine-ferrocene ($C_{24}H_{22}F_{12}FeN_2P_2$), having a structure shown in FIG. 8. The e-fuel charger (2) comprises graphite felt electrodes and anion exchange membrane such as A201, while the e-fuel cell (5) includes carbon paper electrodes and porous membranes such as Celgard 2400.

In a further embodiment, the organic e-fuel system has the same operation mode with the inorganic e-fuel system, except for the composition of the e-fuel. In this organic e-fuel system, there is no safety issue in the storage and transportation of e-fuel. The organic e-fuel system is cost-effective and suitable to be applied as a stationary energy storage system.

In another embodiment, the e-fuel energy storage system can be a nanofluid e-fuel system, wherein the e-fuel is nanofluid electroactive species comprising sulfur hosted in a ZnO yolk-shell structure. The e-fuel charger (2) can comprise conductive carbon black, porous membranes such as Celgard 2400, and carbon paper. The e-fuel cell (5) can comprise carbon nanoparticles such as XC-72, porous membranes such as Celgard 2500, and electrospun carbon substrate.

In another embodiment, the above-mentioned nanofluid e-fuel system has the same operation mode with the inorganic and organic e-fuel systems, except for the composition of the e-fuel. The nanofluid e-fuel system can comprise a S/YS—ZnO structure with diameters ranging from 300 to 500 nm, as shown in FIG. 9. The hollow zinc oxide nanoparticle has a high specific surface area, a low density, and high adsorption ability to sulfides. The YS—ZnO is an effective host material for a high concentration of sulfur impregnation. As a cathode material, its specific capacity can be as high as 294 Ah/L. By being configured to match a suitable anodic e-fuel such as lithium tin oxide, the system can achieve an energy density of greater than 300 Wh/L. The nanofluid e-fuel system has a high energy density and can greatly increase the driving range of the electric vehicle.

FIG. 10 shows a transmission electron microscopy (TEM) image of the S/YS—ZnO structure according to an embodiment of the subject invention. This invention provides an integrated method to produce, store, and use electricity, which is effective to solve the issues of fluctuation, intermittency, grid connection difficulty, and low utilization of solar and wind powers. The invention can realize the large-scale application of renewable energy exhibiting a broad engineering prospect.

The technical features of the above-described embodiments can be combined by requirements. To make the description concise, we do not present all possible combinations in this patent. However, as long as there is no contradiction in the combination of these technical features, it is considered to be the range of this specification.

Since the above-described conditional expressions and exemplary embodiments are to enhance the effect of interaction, it would be obvious to those skilled in the art that the present invention is not necessarily comprised of these conditions. Several variations and modifications may be made without departing from the spirit and scope of the invention.

The invention claimed is:

1. An e-fuel energy storage system, comprising:
an e-fuel, an e-fuel charger, and an e-fuel cell, wherein the e-fuel comprises an electroactive, rechargeable liquid fuel selected from the group consisting of inorganic e-fuel including $Fe^{2+}/Fe^{3+}$, $V^{2+}/V^{3+}$ or $Mn^{2+}/Mn^{3+}$; organic e-fuel including alloxazine and nitroxyl free radical, quinone or methylbipyridine-ferrocene; and nanofluid e-fuel including lithium sulfide, lithium titanate, lithium nickel manganese oxide, zinc oxide, or high-molecular polymer;
the e-fuel charger comprises an anode, a cathode, and a membrane, is configured for charging the e-fuel and is independent of the e-fuel cell; wherein the anode, the cathode, and the membrane are configured to match and be compatible with the e-fuel; and
the e-fuel cell comprises a positive electrode, a negative electrode, and a membrane, and is configured for discharging the e-fuel, wherein the positive electrode, the negative electrode, and the membrane are configured to match and be compatible with the e-fuel.

2. The e-fuel energy storage system of claim 1 wherein the e-fuel comprises $V^{2+}/V^{3+}$ or $V^{2+}/V^{3+}$ and air, wherein the e-fuel charger comprises graphite felt, PBI membrane, and $IrO_2$ catalyst, and the e-fuel cell comprises carbon paper, membrane, and Pt/C catalyst.

3. The e-fuel energy storage system of claim 1, wherein the e-fuel comprises methylbipyridine-ferrocene, and the e-fuel charger comprises graphite felt and anion exchange membrane, while the e-fuel cell comprises carbon paper and porous membrane.

4. The e-fuel energy storage system of claim 1, wherein the e-fuel comprises S/YS—ZnO and e-fuel charger comprises conductive carbon black, porous membrane, and carbon paper, while the e-fuel cell comprises carbon nanoparticles, porous membrane, and electrospun carbon matrix.

5. The e-fuel energy storage system in claim 1 further comprising: an energy source for providing electrical energy to the e-fuel charger, wherein the energy source includes solar energy or wind energy.

6. The e-fuel energy storage system of claim 1 further comprising: a receiver system receiving electrical energy provided by the e-fuel cell, wherein the receiver system comprises a grid system or an off-grid system.

7. The e-fuel energy storage system of claim 2, wherein an operating temperature of the e-fuel energy storage system is equal to or lower than 70° C.

8. The e-fuel energy storage system of claim 2, wherein the e-fuel energy storage system has a maximum power density of 800 mW cm$^{-2}$.

9. An e-fuel energy storage method comprising: obtaining the e-fuel energy storage system of claim 1, and storing energy in said system.

10. The e-fuel energy storage method of claim 9, further comprising:
a charging process of the e-fuel converting electrical energy to chemical energy of the e-fuel provided by the e-fuel charger; and,
a discharging process of the e-fuel converting the chemical energy of e-fuel to electrical energy by the e-fuel cell;

wherein, the e-fuel comprises an electroactive species that is configured to be repeatedly charged and discharged and can stably exist before and after the charging and the discharging processes.

11. An e-fuel energy storage method comprising: obtaining the e-fuel energy storage system of claim 2, and storing energy in said system.

12. An e-fuel energy storage method comprising: obtaining the e-fuel energy storage system of claim 3, and storing energy in said system.

13. An e-fuel energy storage method comprising: obtaining the e-fuel energy storage system of claim 4, and storing energy in said system.

14. An e-fuel energy storage method comprising: obtaining the e-fuel energy storage system of claim 5, and storing energy in said system.

15. An e-fuel energy storage method comprising: obtaining the e-fuel energy storage system of claim 6, and storing energy in said system.

16. An e-fuel energy storage method comprising: obtaining the e-fuel energy storage system of claim 7, and storing energy in said system.

17. An e-fuel energy storage method comprising: obtaining the e-fuel energy storage system of claim 8, and storing energy in said system.

* * * * *